(Model.)

M. NEWLOVE.
CHAIN SAW.

No. 285,651. Patented Sept. 25, 1883.

WITNESSES:
Theo. G. Hoster
C. Sedgwick

INVENTOR:
M. Newlove
BY Munn & Co
ATTORNEYS.

UNITED STATES PATENT OFFICE.

MATTHEW NEWLOVE, OF GRAND ISLAND, NEBRASKA.

CHAIN-SAW.

SPECIFICATION forming part of Letters Patent No. 285,651, dated September 25, 1883.

Application filed May 17, 1883. (Model.)

*To all whom it may concern:*

Be it known that I, MATTHEW NEWLOVE, of Grand Island, in the county of Hall and State of Nebraska, have invented a new and useful Improvement in Chain-Saws, of which the following is a full, clear, and exact description.

This invention relates to endless-chain or flexible saws composed of links or sections forming teeth or cutters, and united together by pivotal connections, and driven by a sprocket or notched wheel, with which the chain-saw engages.

The invention is mainly designed for cutting mortises, and its parts are so constructed and arranged, substantially as hereinafter described, including an inner guide for the chain-saw extending throughout its length, provided with a toothed or notched driving-wheel at its one end and a free or loose notched wheel at its opposite end, around both of which the chain-saw passes, and the whole being so constructed, supported, and carried, that while the cutting is all done at the end of the chain-saw the guide along and around which said saw works may be passed for the greater portion of its length through the mortise, whereby a rotary cutting action is obtained that will cut a mortise deeper than its width, several mortises may be cut at the same time, the accumulation of sawdust in the cut is prevented, clean smooth work is produced, and there is no tendency to split the wood.

Reference is to be had to the accompanying drawings, forming a part of this specification, in which similar letters of reference indicate corresponding parts in all the figures.

Figure 2:
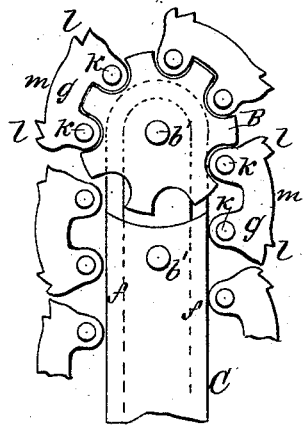
Figure 1:
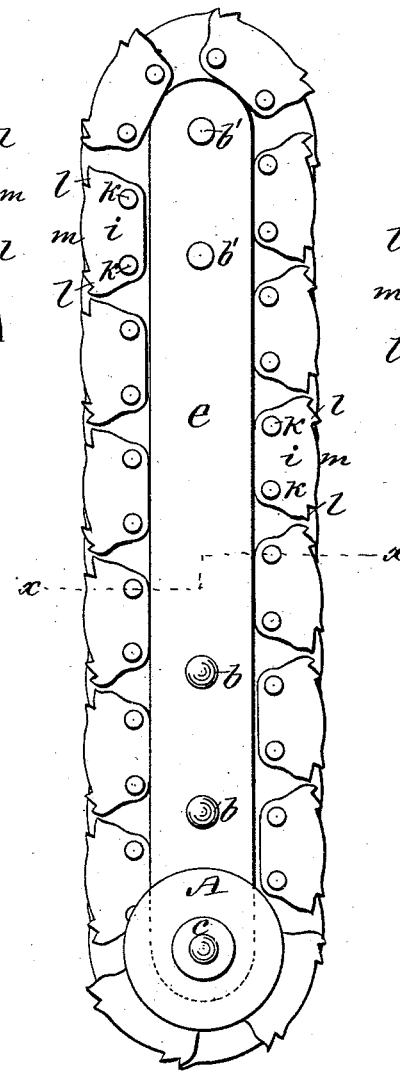
Figure 3:
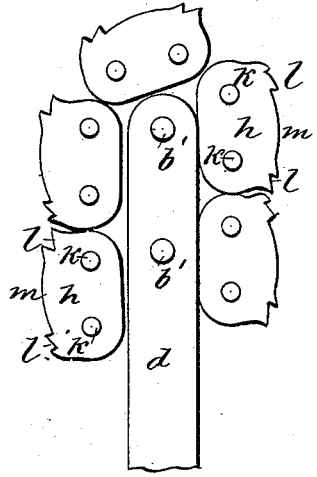
Figure 4:

Figure 1 represents a side longitudinal view of an endless-chain sawing device embodying my invention. Fig. 2 is a section of one end portion of the same in a plane parallel with its side, on the line $y\ y$ in Fig. 4. Fig. 3 is a further side sectional view of a like end portion of the device on the line $z\ z$ in Fig. 4. Fig. 4 is an irregular transverse section, upon a larger scale, on the line $x\ x$ in Fig. 1.

The one end portion of the device on which is the driving-pulley A, for about one-third of the length of the device, is designed to be carried by a fixed frame of any suitable kind, and may be secured thereto by bolts $b\ b$, passing through the inner guide of the chain, thereby leaving two-thirds of the length of the chain (more or less) free to pass through the mortise or mortises to be cut. The driving-pulley A, or, rather, the shaft $c$ of it, which may be rotated otherwise than by means of a pulley, has a chain or toothed or notched wheel on it, similar to the loose or free wheel B at the opposite end of the chain or inner guide which supports the chain. This guide is or may be formed of a central or body piece, C, or the same may be made up of any number of strips or pieces, narrower side strips, $d\ d$, on both or opposite sides of said body-piece, and outer and broader opposite side strips, $e\ e$, all secured together by means of the bolts or rivets $b\ b'$, and the outer strips, $e\ e$, and body-piece C forming grooves or ways $f\ f$ between them, for certain of the saw-links to travel in. The whole guide should be of no greater thickness than that of the combined thickness of the links of the saw at any point in the length of the saw to permit of its projection, along with the saw, into or through the mortise. Furthermore, said guide or chain support is or may be made narrower at its ends than in its center portion to allow the chain or flexible saw free play. The flexible saw is made up of a series of chain-sections, consisting of inner and outer links, $g$, $h$, and $i$, united together by pivotal connections or loosely-fitting rivets $k\ k$. Each of these links is made with outer cutting-teeth, $l$, at their opposite ends; but it is only the central or inner series of links, $g$, (of which there may be any number side by side in each section,) that are arranged and constructed to gear with the pitched wheels B at the ends of the guide, and that travel along or over the body-piece C of the guide, as shown in Fig. 2. Outside of these compound links $g$, on opposite sides of them and connecting them together, and between said links $g$ and the outer links, $i$, are a series of intermediate links, $h$, the rear ends of which are pivoted to the forward ends of the links $g\ i$ and their forward ends to the rear ends of said links $g\ i$. These links $h$ are made broader or deeper than the links $g\ i$, as shown in Figs. 3 and 4, to travel in the grooves or ways $f\ f$ and over the strips or plates $d\ d$, thereby serving to hold the chain in position.

The outer links, $i$, correspond, so far as their toothed exteriors are concerned, with the inner links, $g$, and are of a suitable width, and constructed on their inner edges to travel over the outer strips or plates, $e\,e$, of the guide. The cutting, it should be observed, is all done at the end of the sawing device, and the links are made with a swell or belly, $m$, to protect the sides of the mortise from contact with the teeth while passing through the cut part.

Having thus fully described my invention, I claim as new and desire to secure by Letters Patent—

1. In a chain-saw, the supporting-guide formed of the body-piece C, side strips, $d\,d$, on opposite sides thereof, and the outer broader side strips, $e\,e$, all bolted together and forming grooves $f\,f$, as shown and described.

2. A chain-section consisting of inner and outer links, $g\,h\,i$, pivotally connected, and provided with outer teeth, $l$, at their ends beyond the pivot-holes, as shown and described.

3. A chain-saw link-section having between its outer and inner links, $g\,i$, the intermediate links, $h$, end pivoted to said links $g\,i$ and made deeper, whereby they may travel in ways $f\,f$ and over plates $d$, so as to hold the chain in position, as described.

4. A chain-saw link having a smooth-faced belly or swell between end teeth and extending out beyond said teeth to protect the sides of the mortise cut from contact with the teeth, as described.

MATTHEW NEWLOVE.

Witnesses:
HENRY E. CLIFFORD,
C. F. BRECKENRIDGE.